(12) United States Patent
Schwarz

(10) Patent No.: US 10,092,977 B2
(45) Date of Patent: Oct. 9, 2018

(54) WELDING HEAD AND METHOD FOR JOINING A WORKPIECE

(71) Applicant: PRECITEC KG, Gaggenau-Bad Rotenfels (DE)

(72) Inventor: Joachim Schwarz, Kleinandelfingen (CH)

(73) Assignee: PRECITEC GMBH & CO. KG, Gaggenau-Bad Rotenfels (DE)

( * ) Notice: Subject to any disclaimer, the term of this patent is extended or adjusted under 35 U.S.C. 154(b) by 0 days.

(21) Appl. No.: 15/199,054

(22) Filed: Jun. 30, 2016

(65) Prior Publication Data

US 2016/0311056 A1    Oct. 27, 2016

Related U.S. Application Data

(63) Continuation of application No. 13/498,110, filed as application No. PCT/EP2010/005832 on Sep. 23, 2010, now abandoned.

(30) Foreign Application Priority Data

Sep. 25, 2009    (DE) .................. 10 2009 042 986

(51) Int. Cl.
*B23K 26/03*    (2006.01)
*B23K 26/044*    (2014.01)
(Continued)

(52) U.S. Cl.
CPC ............ *B23K 26/032* (2013.01); *B23K 26/03* (2013.01); *B23K 26/044* (2015.10); *B23K 26/12* (2013.01);
(Continued)

(58) Field of Classification Search
CPC .... B23K 26/032; B23K 26/04; B23K 26/043; B23K 26/044
(Continued)

(56) References Cited

U.S. PATENT DOCUMENTS 4,583,854 A * 4/1986 Lozar ................... G01B 11/022
                                                                250/224
4,710,604 A * 12/1987 Shirasu .............. B23K 26/0853
                                                                219/121.73
(Continued)

FOREIGN PATENT DOCUMENTS

DE        102006004919 A1    8/2007
DE        102007030394        1/2009
(Continued)

*Primary Examiner* — Dana Ross
*Assistant Examiner* — Joe E Mills, Jr.
(74) *Attorney, Agent, or Firm* — Fenwick & West LLP

(57) ABSTRACT

A method for joining a workpiece by means of a welding head, in which at least one line of light is generated on a workpiece, which crosses a joint line at a site to be joined and a joint seam generated at a joined site after processing. The lines of light are imaged at the site to be joined and at the joined site in order to generate reference data relating to the geometry of the site to be joined and measurement data relating to the geometry of the joined sites. The reference data and the measurement data are then compared at one and the same workpiece site before and after processing, in order to determine the geometry of the joint seam independently of the geometry of the site to be joined.

16 Claims, 4 Drawing Sheets

(51) Int. Cl.
  B23K 31/12 (2006.01)
  G01B 5/00 (2006.01)
  G01B 11/06 (2006.01)
  G01B 11/25 (2006.01)
  B23K 26/12 (2014.01)
  G01B 11/14 (2006.01)

(52) U.S. Cl.
  CPC .......... B23K 31/125 (2013.01); G01B 5/0037 (2013.01); G01B 11/0608 (2013.01); G01B 11/14 (2013.01); G01B 11/25 (2013.01)

(58) Field of Classification Search
  USPC ............ 219/121.63, 121.64, 121.78, 121.83; 356/237.1, 237.2; 382/152
  See application file for complete search history.

(56) References Cited

U.S. PATENT DOCUMENTS

| | | | | |
|---|---|---|---|---|
| 5,371,339 A * | 12/1994 | Dillet | ................... | B23K 9/1274 219/124.34 |
| 5,877,960 A * | 3/1999 | Gross | ................... | B23K 9/127 219/121.13 |
| 7,107,118 B2 * | 9/2006 | Orozco | ................... | B23K 26/03 219/121.61 |
| 7,577,285 B2 * | 8/2009 | Schwarz | ............... | B23K 9/0956 219/602 |
| 7,728,254 B2 * | 6/2010 | D'Angelo | ............. | B23K 26/032 219/121.62 |
| 2004/0042001 A1 * | 3/2004 | Vaez-Iravani | ...... | G01N 21/8806 356/237.2 |
| 2005/0041852 A1 * | 2/2005 | Schwarz | ............... | B23K 9/0956 382/152 |
| 2005/0247681 A1 * | 11/2005 | Boillot | ................. | B23K 26/032 219/121.63 |
| 2006/0197945 A1 * | 9/2006 | Tiemeyer | ................ | G01N 21/21 356/237.2 |
| 2007/0106416 A1 * | 5/2007 | Griffiths | ............... | B23K 26/032 700/166 |
| 2008/0144023 A1 * | 6/2008 | Shibata | ................... | G01N 21/21 356/237.2 |
| 2008/0291436 A1 * | 11/2008 | Aiko | .................. | G01N 21/9501 356/237.2 |
| 2009/0145888 A1 * | 6/2009 | Hesse | .................... | B23K 26/04 219/121.64 |
| 2009/0266989 A1 * | 10/2009 | Schwarz | ............... | B23K 9/0956 250/358.1 |

FOREIGN PATENT DOCUMENTS

| | | |
|---|---|---|
| EP | 0770445 A2 | 5/1997 |
| EP | 0822389 A2 | 2/1998 |
| EP | 2062674 | 5/2009 |
| WO | WO-2007/053973 A1 | 5/2007 |
| WO | WO-2008/028580 | 3/2008 |

* cited by examiner

WELDING HEAD AND METHOD FOR JOINING A WORKPIECE

CROSS-REFERENCE TO RELATED APPLICATIONS

This application is a Continuation of co-pending application Ser. No. 13/498,110 filed on May 29, 2012, which is a U.S. National Stage of International Application No. PCT/EP2010/005832 filed on Sep. 23, 2010, for which priority is claimed under 35 U.S.C. § 120; and this application claims priority of Application No. 10 2009 042 986.7 filed in Germany on Sep. 25, 2009 under 35 U.S.C. § 119; the entire contents of all of which are hereby incorporated by reference.

BACKGROUND OF THE INVENTION

Field of the Invention

The invention relates to a welding head, in particular a laser welding head, and to a method for joining a workpiece, in particular by means of a laser beam, by welding or by soldering.

Brief Discussion of the Related Art

With the aid of a laser welding head, a workpiece can be processed by using a laser beam, in which case, for example, welding or soldering work may be carried out in order to join a gap in a workpiece or between two workpieces. In this process, it is necessary to monitor the quality of the weld or solder seams produced by the laser welding head by means of the laser beam. The inspection of the weld or solder seams is carried out by means of image processing, the geometrical properties of the weld seams such as concavity, convexity, seam width or seam thickness inter alia being determined. In order to record these properties, the seam region must be known exactly in the three-dimensional representation, since otherwise irregularities in the workpiece in the region of the seam to be joined will also possibly be included when recording the geometry of the joint seam. The welding process described above is not, however, restricted to laser welding, and for example welding by means of a metal shielding gas welding head likewise requires weld seam monitoring.

The most common evaluation of the three-dimensional geometrical structure of joint sites is carried out by means of laser triangulation. In this method, during a welding process, a light section device is used which is attached to the laser welding or metal shielding gas welding head. The light section device projects a light fan by means of a laser beam onto the workpiece, in order to generate a line of light thereon. From observation of the light section, i.e. the line of light, the geometries of the site to be joined and the joined site after processing by means of the laser beam, i.e. the weld or solder seam, can be determined by means of the shape of the line of light in the processing region.

In known methods for determining the geometry of the joint site for quality monitoring, optionally the sheet metal geometry without a weld or solder seam is stored beforehand and subsequently compared with the measurement data after joining the workpiece. This, however, either requires full knowledge of the sheet metal geometry without a weld seam beforehand or conduct of a reference run before the welding process, in order to record the geometrical data of the joint site without a weld seam. During the inspection, these data are compared with the current measurement data and discrepancies are thus identified. In this method, however, in the event of path changes between the reference and measurement runs, elaborate manual modification of the reference data is necessary. Furthermore, component deviations and modifications of the component during the joining process are not able to be recorded and therefore lead to measurement errors. Furthermore, modification of the component position due to clamping devices is not taken into account.

US 2005/02 47 681 A1 describes a welding head, which comprises a housing through which a beam path for a laser beam is formed. The housing comprises focusing optics, two light section devices which generate two lines of light extending parallel, two CMOS cameras and a processing unit, which is used to observe a joint gap and a weld seam and to monitor a position of the welding head relative to the weld seam.

WO 2008/028 580 A1 describes a method and a device for optical assessment of the weld quality in welding. During the laser welding, the welding region is imaged coaxially to the laser beam through the laser optics, both a triangulation line and a gray or color image of the solidified weld seam, as well as the process light of the welding process, being recorded. Optimal quality assessment of the welding process and the weld seam can be carried out from these three image elements.

DE 10 2006 004 919 A1 describes a laser beam welding head. This laser beam welding head for welding metal parts comprises at least one beam path for a welding beam and means for optically recording the position of the weld seam at a first measurement position, the means for optically recording the position of the weld seam allowing arrangement of the first measurement position running in front of the welding position of the welding beam in the welding direction, and generating a correction signal for correcting the welding position of the welding beam at least as a function of a lateral deviation of the weld seam from a setpoint position, and a corresponding use of the laser beam welding head.

EP 2 062 674 A1 describes a method of preparing for and carrying out a laser welding process. This method of preparing for a laser welding process on a workpiece comprises the steps: recording the position of a joint site on the workpiece with the aid of a sensor device in a first measurement region running in front of a laser beam position, recording the position of the joint site with the sensor device in a second measurement region at the laser beam position and/or in a third measurement region running behind the laser beam position, recording the laser beam position in the second measurement region with the sensor device, and comparing the positions of the joint site in the respective measurement regions and the laser beam position in order to adapt the position, alignment and/or coordinate system of the sensor device and/or of a laser processing head relative to the workpiece.

DE 10 2007 030 395 A1 describes a method and a device for laser beam welding of a workpiece. This method is provided for preferably continuous laser beam welding of a workpiece, in particular a tube, along a welding direction along the workpiece, at least one marking offset with respect to a joint gap in the workpiece being detected on the workpiece in front of a welding site in the welding direction. The at least one marking is also detected behind the welding site in the welding direction, and an optimal welding position of the laser beam transversely to the welding direction is determined from the position transversely to the welding direction of the marking detected in front of and behind the welding site.

EP 0 770 445 A2 describes a method for controlling and positioning a beam for processing workpieces. In a method for controlling and positioning a beam for processing workpieces, a first sensor in front of the beam or a specification determines the path to be tracked by the beam. A second sensor behind the beam monitors the activity of the beam. The specification or the recording results of the first sensor relating to a setpoint position of the beam are compared with recording results of the second sensor relating to an actual position of the beam, while taking into account the speed-dependent relative beam/workpiece displacement. In the event of a difference of the actual position from the setpoint position, the beam is corrected to a base position.

SUMMARY OF THE INVENTION

It is an object of the invention to provide a welding head and a method for joining a workpiece, by which quality monitoring of a joint seam can be carried out easily during an ongoing joining process.

This object is achieved by the welding head as claimed in claim 1 and by the method for joining a workpiece as claimed in claim 16. Advantageous configurations and refinements of the invention are presented in the dependent claims.

The invention provides a welding head for joining a workpiece, which comprises a welding device which is adapted to weld a joint site of the workpiece to be processed inside a working region, a light section device which is attached to the welding device, can be rigidly connected to the housing and has at least one light source for generating at least one line of light inside the working region on the workpiece, which crosses a site to be joined and a site joined after processing by the welding device at a predetermined distance, at least one camera for observing the working region of the workpiece to be processed, which images the line of light in or at the site to be joined and the line of light in or at the joined site at regular time intervals, in order to generate reference data relating to the geometry of the site to be joined and measurement data relating to the geometry of the joined site with a joint seam, and a processing unit for receiving the reference data and measurement data from the at least one camera and for comparing the reference data and measurement data respectively at the same workpiece site before and after processing by the laser beam, so that the geometry of the joint seam can be determined independently of the geometry of the site to be joined.

A welding head for joining by means of welding or soldering is thus provided, in which the monitoring of the weld or solder seam is carried out by recording the geometry of the seam to be joined by means of a line of light running in front and comparing these recorded data with the data recorded by means of a line of light running behind, which images the joined seam. In this case, a processing unit is provided in the welding head, which compares the recorded geometrical data before the joining process and after the joining process so that the data at the same respective workpiece site can be compared with one another. According to the invention, this may be done by determining the joining displacement traveled on the basis of integrating a known joining speed, which corresponds to the speed of the welding head or the speed of the at least one camera which is rigidly connected to the welding head, the joining displacement traveled being compared with the known predetermined distance between the line of light running in front and the line of light running behind, so that a time difference between the reference data and the measurement data can be calculated. From the comparison of the reference data, the geometry of the joint seam can therefore be determined independently of irregularities in the workpiece to be joined in the region of the seam to be joined, and quality monitoring can be carried out in an ongoing joining process.

In one configuration according to the invention, it is particularly advantageous for the welding device to be a metal shielding gas welding head.

In this case, it is particularly expedient for the at least one camera to be attached to an outer side of the welding device. In the case of metal shielding gas welding, it may be expedient to attach two cameras to the outer side of the welding device, since the line of light running in front and the line of light running behind cannot be recorded by means of one camera owing to obstruction by the device. In this case, the recorded images of the two cameras are correlated with one another so that corresponding reference data and measurement data can be generated, as is the case when recording by means of one camera.

In another advantageous configuration, it is expedient for the welding head according to the invention to be a welding head or laser welding head, the welding device comprising a housing, through which a beam path for a laser beam is formed and which has focusing optics for focusing the laser beam onto the joint site of the workpiece to be processed inside the working region. In this case, the light section device having at least one light source for generating at least one line of light inside the working region on the workpiece, which crosses a site to be joined and a site joined after processing by the laser beam at a predetermined distance, is attached to the housing.

For operation of the processing unit, to determine a corrected geometry of the joint seam from the reference data and the measurement data, it is advantageous for the processing unit to comprise a buffer memory for temporarily storing the received reference data, a comparator for comparing the measurement data at a respective first instant with the reference data at a respective second instant, the respective first and second instants respectively having a predetermined time difference, and an integrator for determining the respective predetermined time difference by means of integration of the joining speed with respect to time and comparing the calculated joining displacement with the predetermined distance between the lines of light.

Although in principle it is conceivable for the light section device to be suitable for projecting an annular line of light onto the workpiece, according to a particularly simple configuration of the invention the light section device comprises a first light fan device having a first light source for generating a straight line of light, which crosses the site to be joined, and a second light fan device having a second light source for generating a straight line of light on the workpiece, which crosses the joined site.

For particularly simple evaluation of the reference data and the measurement data and for simple determination of the predetermined distance between the site to be joined and the joined site at the line of light crossing point, it is expedient for the straight lines of light of the first and second light fan devices, which are generated on the workpiece, to run parallel to one another.

In order to be able to determine the distance between the welding device, in particular the focusing optics, and the workpiece easily by means of triangulation, it is expedient for the first and second light fan devices to be arranged with respect to one another so that the light fan of the first light source and the light fan of the second light source respectively strike the workpiece to be processed obliquely with respect to the optical axis of the laser beam.

For producing a small distance between the parallel lines of light in the case of light fan devices mounted rigidly on the welding head, it is particularly expedient for the light fans of the first light source and of the second light source to be arranged with respect to one another so that they converge with one another starting from the respective light sources.

For the function of processing the reference data and the measurement data, a constant distance between the lines of light is indispensable. It is therefore particularly expedient for the welding head furthermore to have a control unit which regulates the distance between the welding device, in particular the focusing optics, and the workpiece to a constant value by determining the distance between the mutually parallel lines of light of the first and second light fan devices.

In a particularly expedient configuration of the welding head, the at least one camera is a CMOS camera.

For a particularly compact configuration of the welding head, it is expedient for the welding head furthermore to have a beam splitter by which an observation beam path of the at least one camera, in the form of a single camera, can be coupled coaxially into the laser beam path. The use of merely one camera is preferred owing to the lower costs and owing to the simpler calculation of the reference data and the measurement data.

Owing to the high intensity and the small beam broadening of laser light, it is advantageous for the first and second light sources to be lasers, in particular semiconductor lasers.

In order to eliminate interfering radiation, such as occurs for example during operation of the welding head, it is expedient for an optical bandpass filter, which is tuned to the wavelengths of the first and second light sources, to be arranged in front of the at least one camera.

The invention furthermore provides a method for joining a workpiece by means of the welding head according to the invention, in particular by a laser beam, which comprises the following steps: generating at least one line of light inside a working region of a workpiece, which crosses a site to be joined and a site joined after processing by the welding device at a predetermined distance, imaging the lines of light in or at the site to be joined and in or at the joined site at regular time intervals by means of at least one camera, in order to generate reference data relating to the geometry of the site to be joined and measurement data relating to the geometry of the joined sites, and processing the reference data and measurement data generated by the at least one camera by means of a processing unit, the processing comprising the comparison of the reference data and measurement data respectively at one and the same workpiece site before and after processing by the laser beam, in order to determine the geometry of the joint seam independently of the geometry of the site to be joined.

Expediently, the processing step furthermore comprises the temporary storage of the received reference data; comparison of the measurement data at a respective first instant with the reference data at a respective second instant, the respective first and second instants respectively having a predetermined time difference; and determining the respective predetermined time difference by means of integration of the joining speed with respect to time and comparison of the calculated joining displacement with the predetermined distance between the lines of light.

In order to ensure a constant distance between the lines of light on the workpiece in the region of the site to be joined and of the joined site, it is furthermore advantageous for the method to comprise the step of regulating the distance between the welding device, in particular the focusing optics, and the workpiece by means of triangulation.

BRIEF DESCRIPTION OF THE DRAWINGS

The invention will be explained in more detail with the aid of the drawing, in which.

DETAILED DESCRIPTION OF THE PREFERRED EMBODIMENTS

Figure 1:
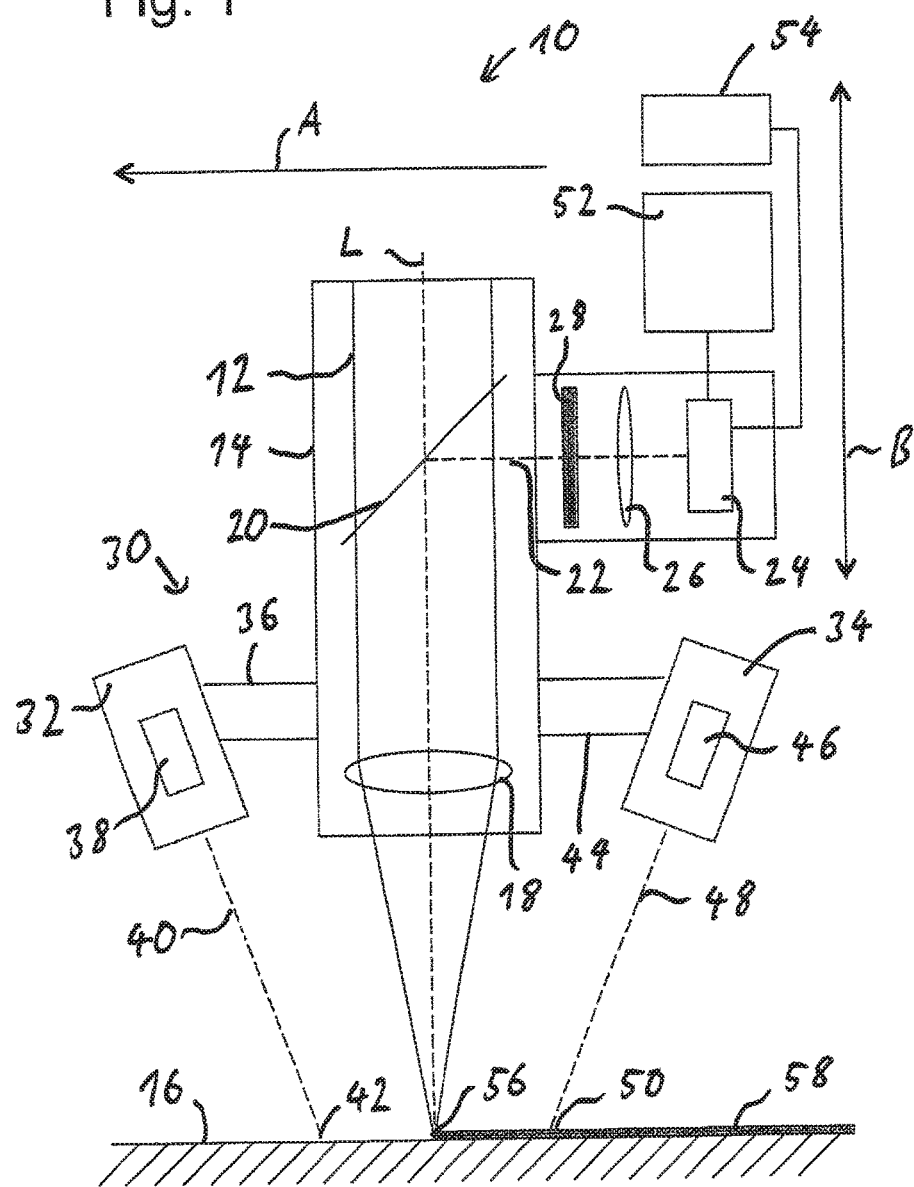
FIG. 1 shows a highly simplified schematic view of a welding head according to an exemplary embodiment of the invention.

In the various figures of the drawing, components which correspond to one another are provided with the same references.

FIG. 1 shows a highly simplified view of a welding head 10, in particular a laser welding head, according to an exemplary embodiment of the invention, in the way it is used with laser processing machines or systems. A working laser beam 12 coming from the laser processing machine is directed through a housing 14 of the welding head 10 onto a workpiece 16 and focused by means of focusing optics 18 onto the workpiece 16, as indicated by the optical axis L. The working laser beam 12 may be broadened, in the case of supply to the welding head 10 by means of a light guide fiber, owing to the extraction of the laser beam from the light guide fiber by collimator optics.

Instead of a laser welding head, a metal shielding gas welding head may also be used as the welding device, in which case two cameras (not shown) are used in order to observe the workpiece. In what follows, however, the invention will be explained with reference to the use of one camera.

In the housing 14 of the welding head 10, a beam splitter 20 is arranged in the passage region of the working laser beam 12 so that an observation beam path 22 (indicated by its optical axis) of a camera 24 is coupled coaxially into the beam path of the working laser beam 12. In the observation beam path 22, imaging optics 26 and an optical bandpass filter 28 are arranged in front of the camera 24. In the exemplary embodiment of the invention as shown in FIG. 1, the observation beam path 22 of the camera 24 is directed by means of the beam splitter 20 onto a working region of the workpiece 16. It is, however, also possible to fit the camera 24 with observation optics on an outer side of the housing 14 of the welding head 10, in which case, however, it is necessary to ensure that the image of the working region of the workpiece 16 as recorded by the camera 24 moves synchronously with a movement of the welding head 10 with the housing 14 and in particular with the focusing optics 18.

Arranged on an outer side of the housing 14 is a light section device 30 which comprises a first light fan device 32 and a second light fan device 34. The first light fan device 32 is mounted by means of a support 36 on a side of the housing 14 which lies at the front during movement of the welding head 10 in its movement direction (indicated by the arrow A).

The first light fan device 32 comprises a first light source 38, by which a light fan 40 is projected in the direction of the workpiece 16, in order to generate a line of light 42 (shown in FIG. 2A) on its surface inside the working region of the welding head 10.

The second light fan device 34 is mounted by means of a support 44 on a side of the housing 14 of the welding head 10 which lies on a rear side of the housing 14 during movement of the welding head 10 in the movement direction A. The second light fan device 34 comprises a second light source 46, by which a light fan 48 is projected in the direction of the workpiece 16, in order to generate a line of light 50 on its surface inside the working region of the welding head 10.

As first and second light sources 38, 46 of the first and second light fan devices 32, 34, respectively, a laser light source is suitable owing to the high intensity and a small intrinsic beam broadening, in which case it may be a semiconductor laser diode. For this, for example, AlGaInP laser diodes having multiple quantum well structures may be used, which have an emission maximum in a wavelength range of between 635 nm and 670 nm. For example, a laser diode having an emission wavelength of 658 nm and an emission power of 66 mW may be used. In this case, for reduction of the interfering radiation recorded by the camera, the transmission wavelength of the optical bandpass filter 28 may be tuned to the wavelength of the first and second light sources 38, 46.

The welding head 10 furthermore comprises a processing unit 52 connected to the camera 24 and a control unit 54, likewise connected to the camera 24, the functions of which will be described in more detail below.

Although the light section device 30 is not restricted to comprising two light fan devices 32 and 34, but may also be in the form of a single device which, for example, projects a conical light fan around the focal point of the laser beam 12 onto the workpiece 16 in order to generate a circular or elliptical line of light, according to the invention it is advantageous for the first light fan device 32 and the second light fan device 34 respectively to generate light fans 40 and 48 which lie in an emission plane, so that straight lines of light 42 and 50 are respectively projected onto the surface of the workpiece 16.

The function of the welding head 10 according to the invention will now be explained below with the aid of FIGS. 2A and 2B.

Figure 2A:
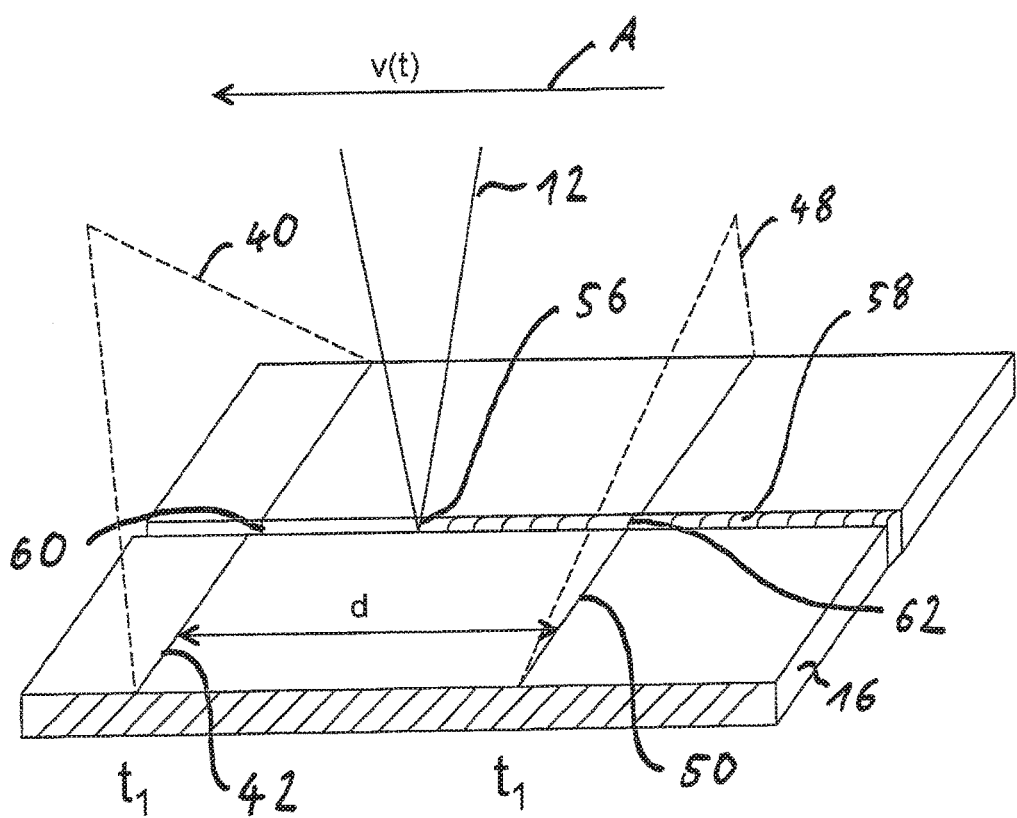
FIG. 2A shows a highly simplified perspective detail view of the workpiece during a joining process at a first instant.

In a joining process carried out by the welding head 10, which may be a welding or soldering process, the welding head 10, as shown by the arrow A indicated in FIG. 1 and FIG. 2, is moved with a speed v(t) over a workpiece 16 to be joined (which may consist of two metal sheets or similar elements to be connected together), the focused laser beam 12 striking a respective joint site 56 and, owing to the welding process, generating a joint seam 58 which connects together the workpiece parts shown in FIG. 2A.

The line of light 42 of the first light fan device 32 is projected onto the workpiece 16 so that it runs in front of the focal point of the laser beam 12, i.e. the respective joint site 56, so that geometrical data of the site to be joined can be recorded by means of the camera 24 which acquires the entire working region including the line of light 42, the joint site 56 and the line of light 50, in order to record reference data relating to the site 60 to be joined.

In a similar way, the line of light 50 generated by the second light fan device 34 on the workpiece 16 runs behind the focal point 56 of the laser beam 12 and crosses an already joined site 62, so that measurement data can be recorded by the camera 42 relating to the geometry of the weld seam 58.

As shown in FIG. 1 and FIG. 2A, the first light fan device 32 and the second light fan device 34 are arranged with respect to one another so that they generate light fans which respectively strike the workpiece 16 to be processed obliquely with respect to the optical axis of the laser beam 12, so that, during an up and down movement of the housing 14 along the optical axis L (see arrow B), the respective projected lines of light 42 and 50 on the workpiece 16 move to and fro relative to the working laser beam 12 striking the workpiece 16. In the case shown in FIG. 1 and FIG. 2A, the line of light 42 generated by the first light fan device 32 and the line of light 50 generated by the second light fan device (in the case of a plane surface of the workpiece 16) extend mutually parallel to one another, the light fans of the first and second light fan devices 32, 34 converging with one another. A distance d between the lines of light 42 and 50 therefore increases when the welding head 10 is moved downward and the distance d between the lines of light 42, 50 decreases when the welding head 10 is moved upward.

Since, for an optimal joining process, the focus of the working laser beam 12 should always extend at a predetermined height along the sites to be joined, the distance d between the lines of light recorded by the camera 24 is evaluated by the control unit 54 (FIG. 1) and, by controlling an actuator (not shown) for an upward or downward movement of the housing 14 (see arrow B), is regulated to a predetermined distance d which in turn corresponds to an optimal focal position of the working laser beam 12 on the joint site 56.

Thus, a constant predetermined distance d between the line of light 42 of the first light fan device 32 and the line of light 50 of the second light fan device 34 can be maintained by the control unit 54 during the joining process.

The method according to the invention for quality monitoring of the joint seam 58 will now be explained below with the aid of FIGS. 2A, 2B and 3.

FIG. 2A shows the lines 42 and 50 projected onto the workpiece 16 at an instant $t_1$. On the basis of the line shape, the lines of light 42 and 50 respectively at the site 60 to be joined and the joined site 62, which are imaged by the camera 24 at regular time intervals, provide information about the geometry or the height profile of the respective sites 60 to be joined or the respective joined sites 62 at corresponding discrete instants throughout the joining process. The object of the monitoring method according to the invention is in this case to determine geometrical data of the joined site 62 independently of the geometry of the site 60 to be joined, so that only lines of light which are located at the same workpiece site (before and after the joining process) are respectively compared with one another for matching or balancing.

This object is achieved according to the invention in that, as shown in FIG. 2A, the line of light 42 is first recorded by the camera at an instant $t_1$ and these data are stored as reference data. At an instant $t_2$ (FIG. 2B), at which the line of light 50 running behind the laser processing beam 12 has moved forward by the predetermined distance d because of the joining speed v(t), the line of light 50 is recorded and the geometrical data of the seam now joined are stored as measurement data. The reference data for the instant $t_1$ are then compared with the measurement data for the instant $t_2$, which relate to the same workpiece site.

Figure 3:
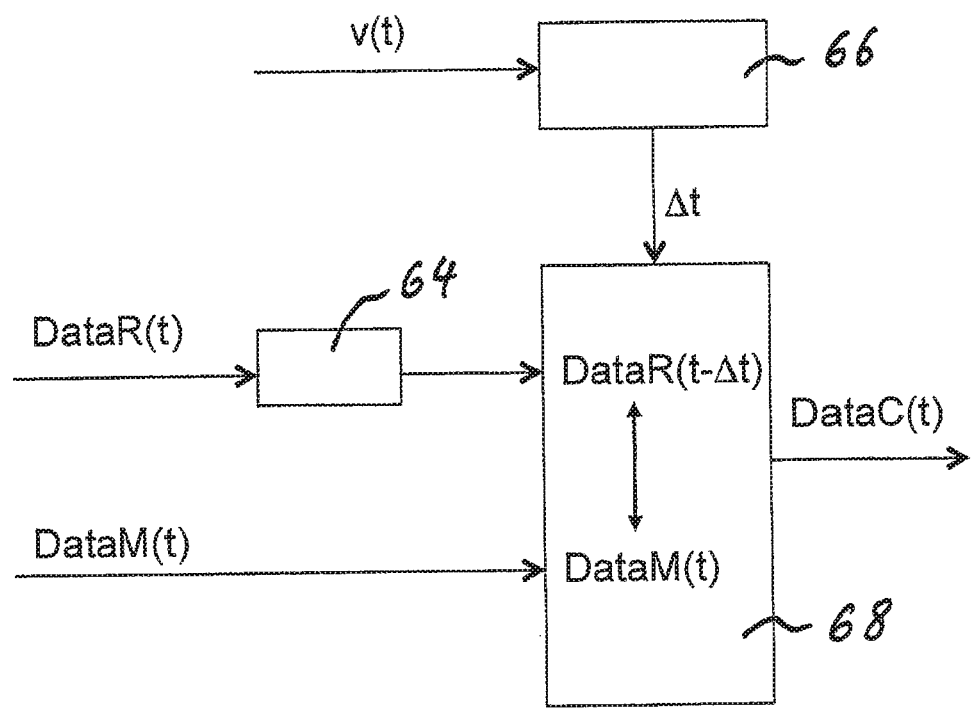
FIG. 3 shows a block diagram of a processing unit of the welding head according to the invention.

According to the invention, this is achieved by the processing unit 52 (FIG. 1), the block diagram of which is shown in FIG. 3.

The processing unit 52 receives at an instant $t_1$ image data of the lines of light 42, 50 from the camera 24, from which reference data DataR(t) relating to the site 60 to be joined are determined by means of the line of light 42 and measurement data DataM(t) relating to the geometry of the joined site 62 are determined by means of the line of light 50, i.e. the corresponding light sections.

In order to permit comparison of the reference data DataR(t) relating to the site 60 to be joined with corresponding measurement data DataM(t) at the same workpiece site, the reference data DataR(t) are first loaded into a buffer memory 64 in which the reference data DataR(t) can be temporarily stored over a particular period of time. The processing unit 52 furthermore comprises an integrator 66, which receives from the welding head 10 the current joining speed v(t) (which may also be constant) and which determines the associated joining displacement that has been traveled by integrating the joining speed v(t) with respect to time. By comparing the joining displacement traveled with the predetermined distance d, the integrator 66 can thus determine the time difference Δt by which the reference data DataR(t) and the current measurement data DataM(t) are mutually shifted in time, so that a comparison of the temporally offset reference data DataR(t-Δt) and the current measurement data DataM(t) corresponds to a comparison of measurement data and reference data at the same workpiece site.

Figure 2B:
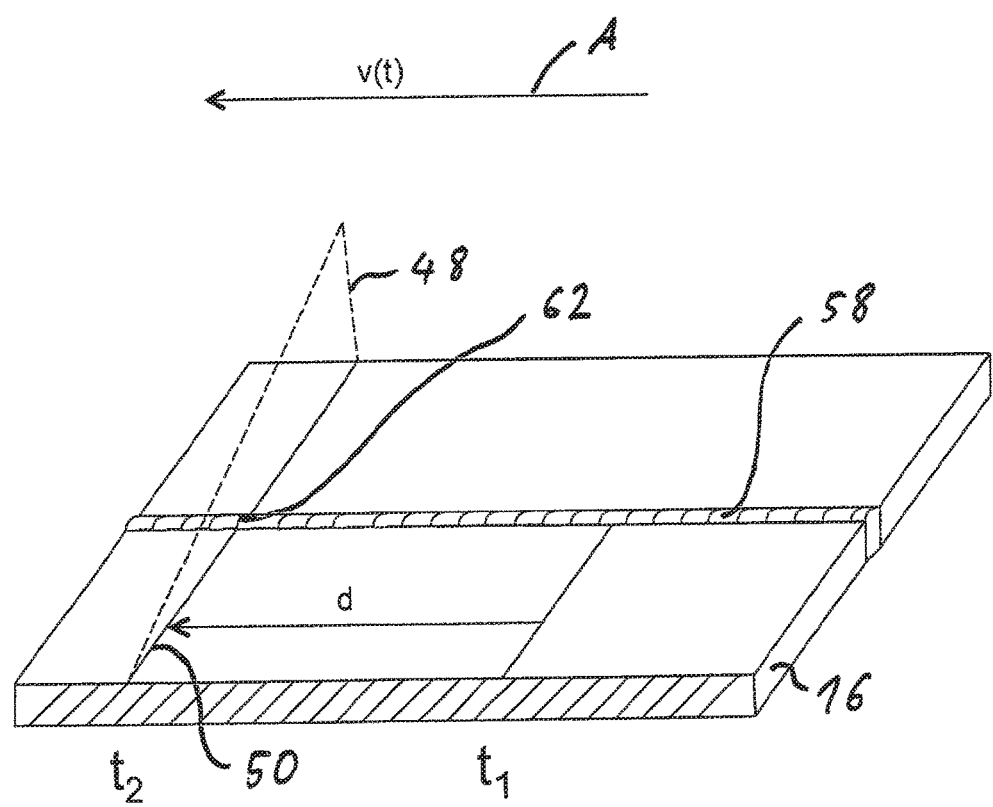
FIG. 2B shows a highly simplified perspective detail view of the workpiece during the joining process at a second instant.

This instant is illustrated in FIG. 2B. After the time Δt has elapsed, because of the joining speed v(t) the line of light 50 has traveled forward by the predetermined distance d in the movement direction of the welding head 10, so that now at the instant $t_2$ it is at a site of the workpiece 16 where the line of light 42 was at the instant $t_1$ (FIG. 2A). By integrating the joining speed v(t) with respect to time and comparing the displacement traveled with the predetermined distance d, measurement data and reference data can therefore be determined at the same workpiece site.

Furthermore, in addition, by recording the position and orientation of the welding head 10 relative to the workpiece 16 (for example by determining the path data of a robot arm which carries the welding head 10), it is possible to correct errors which result from the projection of the lines of light 42, 50 onto the workpiece 16 starting from a welding head 10, the beam axis L of which is not perpendicular to the workpiece surface.

As shown in FIG. 3, geometrical data DataC(t) of the joint seam 58 at corresponding instants (which may be discrete) are determined from the comparison of the reference data DataR(t-Δt) and the measurement data DataM(t), which are independent of the geometry of the site 60 to be joined, in a comparator 68.

Thus, by integrating sensors running in front and behind in or on the welding head 10, reference data relating to the geometry of the parts before the welding and measurement data relating to the geometry after the welding can be acquired simultaneously, so the matching of the geometrical data can be carried out during the welding process. Online monitoring of the weld seam being produced is therefore possible during the welding process.

The method according to the invention and the welding head according to the invention therefore have the advantage that a reference run for recording reference data is obviated, so that a higher measurement accuracy is achieved and effects on the weld seam analysis due to component tolerances, a clamping device which is used or deformation by the joining, can be minimized or even eliminated owing to the recording of reference data directly before the joining process. Furthermore, the inspection sensors can be set up simply.

Thus, even during the process of joining a workpiece having component variations, in the event of path inaccuracies of the sensor guiding system or in the event of deformations during the joining process or modifications due to the clamping device, simple quality monitoring of weld and solder seams of all kinds can thus be carried out in the ongoing joining process.

The invention claimed is:

1. A welding head for joining a workpiece, comprising:
a welding device configured to weld a joint site of the workpiece to be processed inside a working region;
a light section device which is attached to the welding device and has at least one light source for generating at least a first and a second line of light inside the working region on the workpiece, which crosses a joint line at a site to be joined and a joint seam generated at a joined site after processing by the welding device;
at least one camera configured to observe the working region of the workpiece to be processed, which images the first line of light at the site to be joined and the second line of light at the joined site, in order to generate reference data (DataR(t)) relating to the geometry of the site to be joined and measurement data (DataM(t)) relating to the geometry of the joined site with a joint seam; and
a processing unit configured to receive the reference data (DataR(t)) and measurement data (DataM(t)) from the at least one camera and for comparing the reference data (DataR(t)) and measurement data (DataM(t)) respectively at the same workpiece site before and after processing by the welding device, so that the geometry of the joint seam can be determined independently of the geometry of the site to be joined,
wherein the processing unit comprises:
buffer memory configured to temporarily store the received reference data;
a comparator configured to compare the measurement data (DataM(t)) at a respective first instant ($t_1$) with the reference data (DataR(t)) at a respective second instant ($t_2$), the respective first ($t_1$) and second ($t_2$) instants respectively having a predetermined time difference (Δt); and
an integrator configured to determine the respective predetermined time difference (Δt) by integration of a joining speed (v(t)) with respect to time, and configured to compare a calculated joining displacement with a predetermined distance (d) between the first and second line of light sections,
wherein the light section device comprises:
a first light fan device having a first one of said light source configured to generate the first line of light; and
a second light fan device having a second one of said light source configured to generate the second line of light on the workpiece,
wherein the light source for the first and second light fan devices comprise a semiconductor laser, and wherein an optical bandpass filter, which is tuned to the wavelengths of the first and second light sources, is arranged in front of the at least one camera.

2. The welding head as claimed in claim 1, wherein the welding device is a metal shielding gas welding device.

3. The welding head as claimed in claim 2, wherein the at least one camera is attached to an outer side of the welding device.

4. The welding head as claimed in claim 1, wherein the welding device comprises a housing, through which a beam path for a laser beam is formed and which has focusing optics for focusing the laser beam onto the joint site of the workpiece to be processed inside the working region.

5. The welding head as claimed in claim 1, wherein the first line of light crosses the joint line at the site to be joined, and the second line of light crosses the joint seam at the joined site, and the first and second line of light are straight lines.

6. The welding head as claimed in claim 5, wherein the straight lines of the first and second light of the first and second light fan devices, which are generated on the workpiece, are parallel.

7. The welding head as claimed in claim 6, wherein the first and second light fan devices are arranged with respect to one another so that the light fan of the first light source and the light fan of the second light source respectively strike the workpiece to be processed obliquely with respect to an optical axis (L) of the laser beam, so that a distance between the welding device and the workpiece can be determined by triangulation.

8. The welding head as claimed in claim 7, wherein the light fans of the first light source and of the second light source are arranged with respect to one another so that they converge with one another starting from the respective light sources.

9. The welding head as claimed in claim 6, further comprising a control unit which regulates the distance between the welding device and the workpiece to a constant value by determining the distance (d) between the mutually parallel lines of light of the first and second light fan devices.

10. The welding head as claimed in claim 1, wherein the at least one camera is a CMOS camera.

11. The welding head as claimed in claim 4, having a beam splitter by which an observation beam path of the camera can be coupled coaxially into a path of the laser beam.

12. The welding head as claimed in claim 5, wherein the first and second light sources are lasers.

13. The welding head as claimed in claim 12, wherein the lasers are semiconductor lasers.

14. A method for joining a workpiece by a welding head, comprising:
welding, by a welding device, a joint site of the workpiece to be processed inside a working region;
generating, by a light section device, at least a first and a second line of light inside the working region on the workpiece, which crosses a joint line at a site to be joined and a joint seam generated at a joined site after processing by the welding device;
observing, by at least one camera, the working region of the workpiece to be processed, which images the first line of light at the site to be joined and the second line of light at the joined site, in order to generate reference data (DataR(t)) relating to the geometry of the site to be joined and measurement data (DataM(t)) relating to the geometry of the joined site with a joint seam; and
receiving, by a processing unit, the reference data (DataR(t)) and measurement data (DataM(t)) from the at least one camera and for comparing the reference data (DataR(t)) and measurement data (DataM(t)) respectively at the same workpiece site before and after processing by the welding device, so that the geometry of the joint seam can be determined independently of the geometry of the site to be joined, the method comprising:
and
processing the reference data (DataR(t)) and measurement data (DataM(t)) generated by the at least one camera by a processing unit, the processing comprising the comparison of the reference data (DataR(t)) and measurement data (DataM(t)) respectively at one and the same workpiece site before and after processing by the laser beam, in order to determine the geometry of the joint seam independently of the geometry of the site to be joined,
wherein said processing the reference data further comprises:
temporarily storing the received reference data (DataR(t));
comparing the measurement data (DataM(t)) at a respective first instant ($t_1$) with the reference data (DataR(t)) at a respective second instant ($t_2$), the respective first ($t_1$) and second ($t_2$) instants respectively having a predetermined time difference ($\Delta t$);
integrating the joining speed (v(t)) with respect to time; and
comparing the calculated joining displacement with the predetermined distance (d) between the first and second lines of light sections.

15. The method as claimed in claim 14, further comprising regulating the distance between the welding device and the workpiece by triangulation.

16. The welding head as claimed in claim 1, wherein the semiconductor laser comprise a AlGaInP laser diode having multiple quantum well structures and which have an emission maximum in a wavelength range of 635 nm to 670 nm.

* * * * *